US012633221B2

(12) United States Patent
Apcar et al.

(10) Patent No.: US 12,633,221 B2
(45) Date of Patent: May 19, 2026

(54) AIRSPACE SURVEILLANCE USING A SATELLITE NETWORK

(71) Applicant: Cisco Technology, Inc., San Jose, CA (US)

(72) Inventors: Jeff Apcar, Willoughby (AU); Thomas Szigeti, Vancouver (CA); David John Zacks, Vancouver (CA); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 18/104,200

(22) Filed: Jan. 31, 2023

(65) Prior Publication Data

US 2024/0257645 A1     Aug. 1, 2024

(51) Int. Cl.
*G08G 5/20*      (2025.01)
*B64D 45/00*     (2006.01)
*H04B 7/185*     (2006.01)

(52) U.S. Cl.
CPC .............. *G08G 5/20* (2025.01); *B64D 45/00* (2013.01); *H04B 7/1851* (2013.01)

(58) Field of Classification Search
CPC ... G08G 5/20; G08G 5/26; G08G 5/00; B64D 45/00; H04B 7/1851; H04B 7/18508; H04H 20/55
See application file for complete search history.

(56) References Cited

U.S. PATENT DOCUMENTS

| | | | |
|---|---|---|---|
| 8,498,803 B2 * | 7/2013 | Blomenhofer et al. | ..................... G06F 19/00 |
| 2010/0171647 A1 * | 7/2010 | Naravanamurthy | .... G01S 13/00 |
| 2011/0015852 A1 | 1/2011 | Blomenhofer et al. | |
| 2016/0318622 A1 * | 11/2016 | Haukom | ................ B64D 45/00 |
| 2018/0227041 A1 | 8/2018 | Alminde et al. | |
| 2019/0042748 A1 | 2/2019 | Shabtai et al. | |
| 2022/0058960 A1 * | 2/2022 | Stein | ........................ G08G 5/00 |

FOREIGN PATENT DOCUMENTS

| | | |
|---|---|---|
| CN | 113553983 A | 10/2021 |
| EP | 2296128 A1 | 3/2011 |

OTHER PUBLICATIONS

Nguyen, et al., "Low-Earth Orbit Satellite Constellation for ADS-B Based In-Flight Aircraft Tracking," Advances in Aircraft and Spacecraft Science, vol. 2, No. 1, Jan. 2015, pp. 95-108.

* cited by examiner

*Primary Examiner* — Hunter B Lonsberry
(74) *Attorney, Agent, or Firm* — Lee & Hayes, P.C.

(57) ABSTRACT

This disclosure describes techniques for tracking aircraft using a satellite network. An example method includes receiving ADS-B messages from multiple aircraft; determining that at least one of the ADS-B messages satisfies at least one condition; and in response to determining that at least one of the ADS-B messages satisfies the at least one condition, transmitting an alert. In some cases, a system transmits an instruction to perform the example method to at least one satellite and receives the alert.

20 Claims, 4 Drawing Sheets

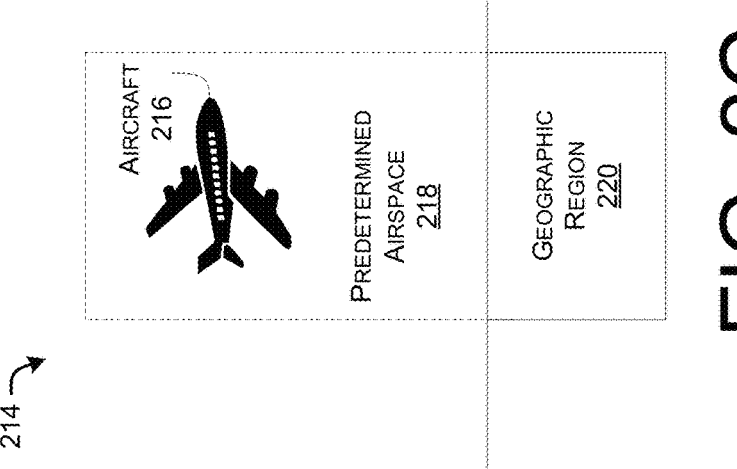
FIG. 2C
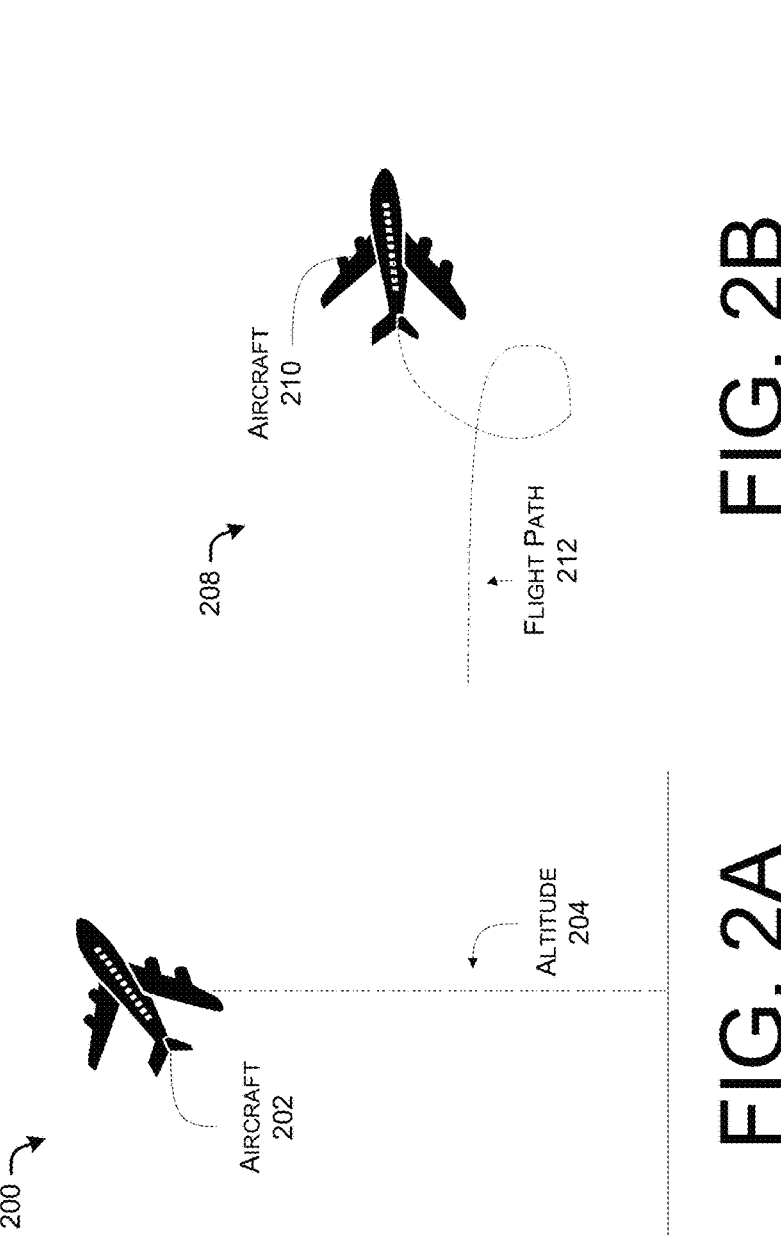
FIG. 2B
FIG. 2A

300 ⟍

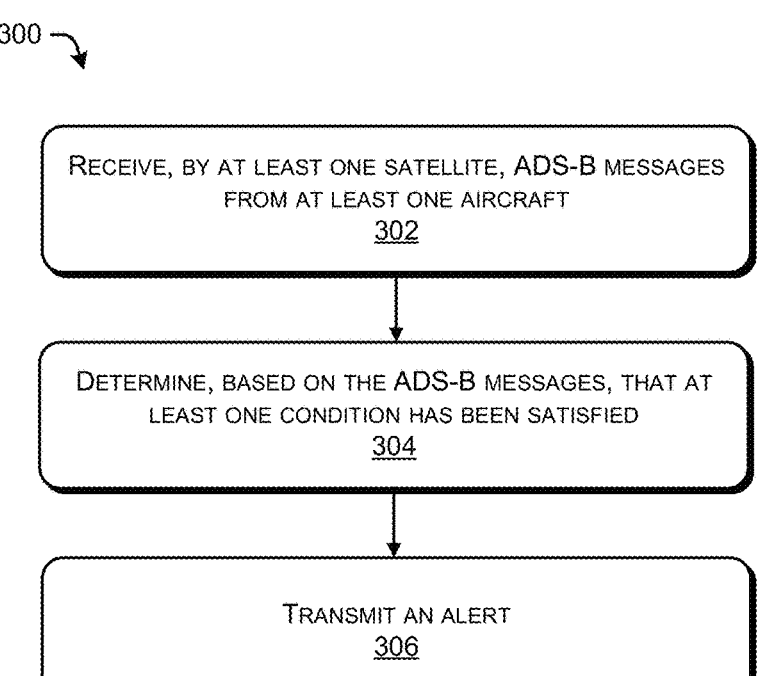

RECEIVE, BY AT LEAST ONE SATELLITE, ADS-B MESSAGES
FROM AT LEAST ONE AIRCRAFT
302

DETERMINE, BASED ON THE ADS-B MESSAGES, THAT AT
LEAST ONE CONDITION HAS BEEN SATISFIED
304

TRANSMIT AN ALERT
306

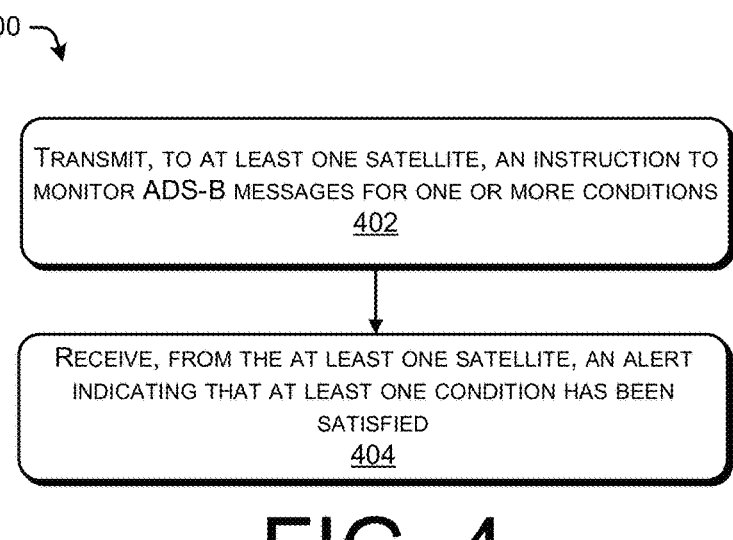

TRANSMIT, TO AT LEAST ONE SATELLITE, AN INSTRUCTION TO
MONITOR ADS-B MESSAGES FOR ONE OR MORE CONDITIONS
402

RECEIVE, FROM THE AT LEAST ONE SATELLITE, AN ALERT
INDICATING THAT AT LEAST ONE CONDITION HAS BEEN
SATISFIED
404

FIG. 4

AIRSPACE SURVEILLANCE USING A SATELLITE NETWORK

TECHNICAL FIELD

The present disclosure relates generally to techniques for locating and monitoring aircraft using a satellite network.

BACKGROUND

The location and status of aircraft flying through the atmosphere can be identified by monitoring Automatic Dependent Surveillance-Broadcast (ADS-B) beacons transmitted by the aircraft. In general, an aircraft can derive its own location by receiving communications from local satellites, such as satellites within the Global Positioning System (GPS). The aircraft indicates its location, as well as other relevant flight information, in the ADS-B beacons. Terrestrial receivers can forward the information encoded into the ADS-B beacons to air traffic control and other parties, which enables tracking of the aircraft. ADS-B beacons are transmitted as electromagnetic signals at a frequency of 1090 megahertz (MHz). As of 2020, civil aircraft operating in Europe and the United States are required to transmit ADS-B beacons.

Problems can arise, however, when an aircraft's ADS-B beacons are unreachable by the terrestrial receivers and other methods such as radio detection and ranging (RADAR) are not available. For example, an aircraft may be untraceable as it is flying over deep ocean, the remote tundra, nations with minimal infrastructure, and the like. This lack of traceability can have tragic consequences if the aircraft encounters problems. For example, it may be impossible to recover the aircraft or its passengers if the aircraft lands in an area without terrestrial receivers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A to 2C illustrate examples of types of aircraft conditions that can be indicated in ADS-B messages and tracked by a satellite network.

FIG. 3 illustrates an example process for monitoring aircraft using ADS-B messages.

FIG. 4 illustrates an example process for instructing at least one satellite to perform surveillance on aircraft.

DESCRIPTION OF EXAMPLE EMBODIMENTS

Overview

Figure 1:
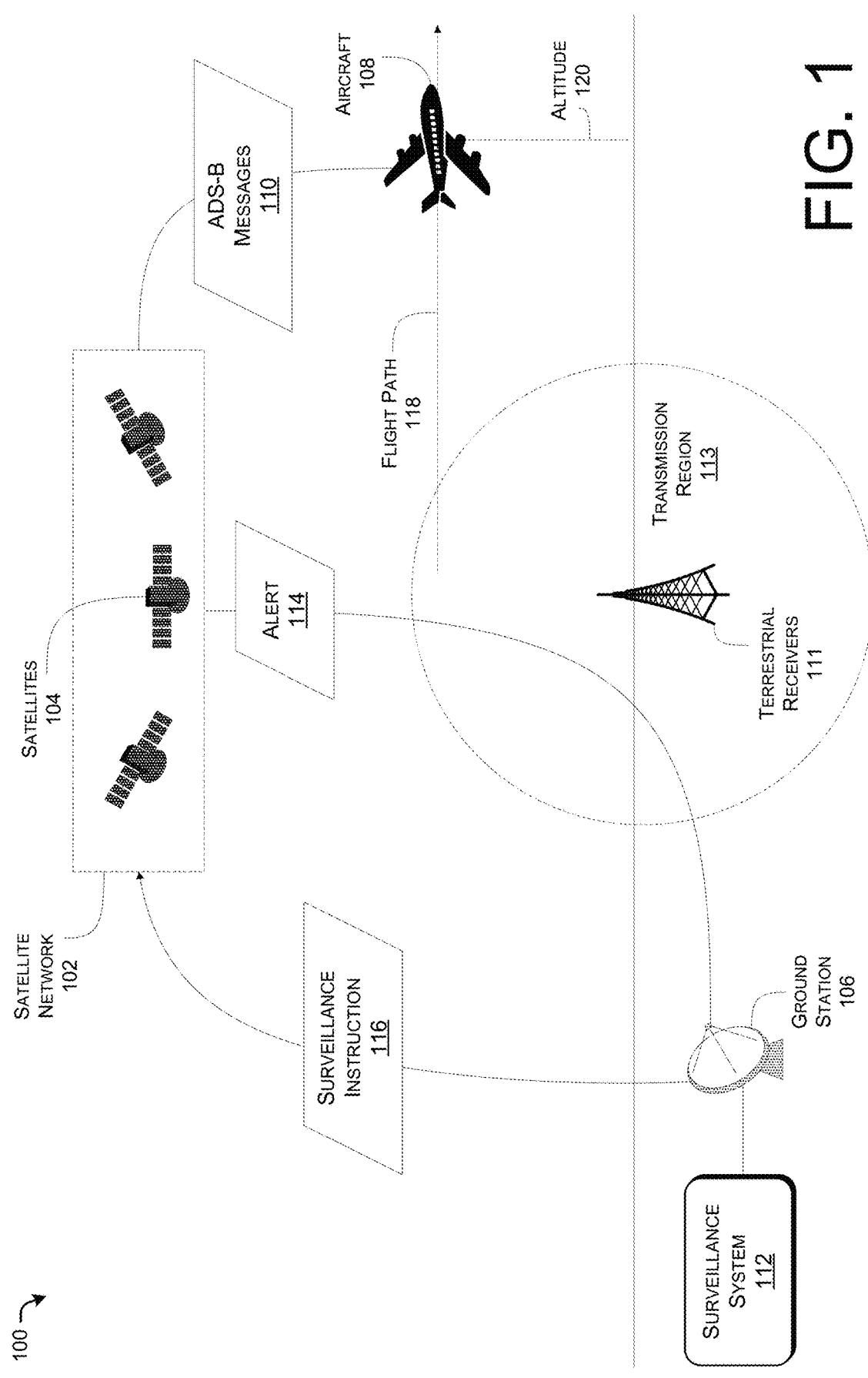
FIG. 1 illustrates an example environment for performing satellite-based aircraft surveillance.

This disclosure describes various techniques for tracking aircraft using a satellite network. An example method includes transmitting, to at least one low earth orbit (LEO) satellite in a satellite network, an instruction to: receive ADS-B messages from multiple aircraft; determine that at least one of the ADS-B messages satisfies at least one condition; and in response to determining that at least one of the ADS-B messages satisfies the at least one condition, transmit an alert. The example method may further include receiving, from the at least one satellite, the alert.

In various examples, the at least one LEO satellite being at least one first LEO satellite, wherein the at least one first LEO satellite is configured to transmit the instruction to at least one second LEO satellite in the satellite network.

In some cases, the instruction is to determine that at least one of the ADS-B messages satisfies at least one condition by determining that at least one of the ADS-B messages indicates an anomalous flight path.

According to various implementations, the instruction is to determine that at least one of the ADS-B messages satisfies at least one condition by determining that at least one of the ADS-B messages indicates an anomalous flight altitude.

In some examples, instruction is to determine that at least one of the ADS-B messages satisfies at least one condition by determining that at least one of the ADS-B messages indicates that a particular aircraft among the aircraft is in a predetermined airspace. For instance, the predetermined airspace includes a region that omits a coverage area of a terrestrial ADS-B receiver.

In various instances, the instruction is to determine that at least one of the ADS-B messages satisfies at least one condition by determining that at least one of the ADS-B messages was transmitted by a predetermined aircraft among the aircraft.

The example method, in some examples, is performed by a ground station.

EXAMPLE EMBODIMENTS

Despite the ubiquity of ADS-B messaging in modern aircraft, it is difficult to monitor aircraft in regions with minimal coverage of terrestrial receivers. According to various implementations of the present disclosure, a satellite network is utilized to receive ADS-B messages from an aircraft and monitor the aircraft. In various implementations, a ground station instructs one or more satellites in the network to monitor aircraft flying above the Earth. The satellite(s) are configured to receive ADS-B messages from the aircraft and to determine, based on the ADS-B messages, whether the aircraft satisfies one or more conditions. For instance, the satellite(s) determine whether the aircraft exhibits anomalous behavior, whether the aircraft is an aircraft flagged for surveillance, or whether the aircraft is detected within a predetermined (e.g., protected) airspace.

ADS-B messages can travel hundreds of kilometers (km). The satellite(s) orbit the Earth and therefore can receive ADS-B messages that would otherwise not be detected by terrestrial receivers. For instance, the satellite(s) include one or more low earth orbit (LEO) satellites, which are physically in range of the ADS-B messages while in orbit. Thus, the coverage area of the ADS-B messages can be greatly enhanced when the satellite(s) are utilized as receivers of the ADS-B messages.

In various cases, the satellite(s) alert the ground station if the condition(s) are satisfied. According to various examples, the satellite(s) refrain from merely forwarding the ADS-B messages as-received. Instead, the satellite(s) may transmit a single message as an alert based on analyzing multiple ADS-B messages, for instance. In various cases, the alert transmitted by the satellite(s) includes fewer bytes than the ADS-B messages analyzed by the satellite(s). Thus, the alerts transmitted by the satellite(s) can provide a significant improvement over conventional ADS-B message forwarding technologies by aggregating information in the ADS-B messages, summarizing information in the ADS-B messages, and conserving communication resources associated with the satellite network.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for performing satellite-based aircraft surveillance. In various implementations, a satellite network 102 includes multiple satellites 104 orbiting the earth. As used herein, the term "satellite," and its equivalents, refers to a computing device that is orbiting the Earth. Each one of the satellites 104 may transmit communication signals into an associated coverage region, and may receive communication signals from other devices within the coverage region. Because the satellites 104 move over time, their respective coverage regions also move over time. The satellites 104, for instance, are nodes within the satellite network 102. In some examples, a device at one location on the surface of the earth can communicate with another device at another location on the surface of the earth by transmitting data to at least one of the satellites 104 in the satellite network 102. The data, for instance, can be relayed to the other device along a path of one or more communicatively coupled satellites 104 in the satellite network 102. In some cases, the satellites 104 include one or more low earth orbit (LEO) satellites. LEO satellites orbit the earth at a height of about 100 to 2,000 kilometers (km) above the surface of the earth.

In various cases, the satellites 104 are configured to transmit and/or receive communication signals with one another using wireless communication techniques. In addition, the satellites 104 may be configured to transmit and/or receive communication signals with various ground stations, such as ground station 106, using wireless communication techniques. As used herein, the term "ground station," and its equivalents, refers to a terrestrial device that is configured to transmit communication signals to one or more satellites and to receive communication signals from one or more satellites. In various implementations, the satellites 104 and the ground station 106 exchange communication signals that are electromagnetic (EM) signals within the RF range. These communication signals may encode various data, such as user data.

Various aircraft may be traveling or otherwise disposed in the earth's atmosphere, such as aircraft 108 illustrated in FIG. 1. As used herein, the term "aircraft," and its equivalents, may refer to a vehicle configured to move through the air via a force supported by the air. Examples of aircraft include airplanes, helicopters, blimps, gliders, hot air balloons, and the like. Aircraft may be unmanned and/or unmanned. Aircraft can be powered, such as by propellers, jet engines, rockets, or rotors. In some cases, aircraft are unpowered, and resist gravity via a balloon, a sail, or the like.

In various implementations, the aircraft 108 identifies its position using a global navigation satellite system (GNSS), such as the Global Positioning System (GPS), Global navigation Satellite System (GLONASS), BeiDou Navigation Satellite System, or Galileo. For instance, the aircraft 108 may receive GNSS messages broadcasted from multiple satellites indicating their respective orbital data and the transmission times of the GNSS messages. Based on the GNSS messages received by the aircraft 108, the aircraft 108 may determine its position with respect to the earth. According to various implementations, the satellites transmitting the GNSS messages are different than the satellites 104 described with respect to FIG. 1. For instance, the satellites transmitting the GNSS messages include medium earth orbit satellites that orbit the earth at a higher altitude than the satellites 104.

The aircraft 108 is configured to broadcast automatic dependent surveillance-broadcast (ADS-B) messages 110. As used herein, the term "ADS-B message," and its equivalents, may refer to an electromagnetic signal transmitted by an aircraft and encoding information reporting an identity and/or status of the aircraft. For example, the ADS-B messages 110 indicate at least one of an identifier of the aircraft 108, a surface position of the aircraft 108, an airborne position of the aircraft 108 (e.g., including baro-corrected altitude and/or GNSS height), an airborne velocity of the aircraft 108, a status of the aircraft 108, a target state of the aircraft 108, an operation status of the aircraft 108, or any combination thereof. In various implementations, the identifier of the aircraft 108 includes an ICAO address associated with the aircraft 108. For instance, the identifier is represented as a 24-bit code that is uniquely associated with the aircraft 108. According to some examples, the aircraft 108 determines its surface position and/or altitude based on the GNSS messages. In some cases, the aircraft 108 determines its altitude based on detecting a pressure at the aircraft 108.

In some implementations, the ADS-B messages 110 are included in a 1090 MHz extended squitter (1090ES) message, transmitted over the 1090 MHz band. The 1090ES message may include 112 bits including 8 control bits, 24 bits indicating an identifier of the aircraft 108, 56 bits indicating one of the ADS-B messages 110, and 24 parity bits. In various cases, the ADS-B messages 110 (e.g., the 1090ES messages) are retransmitted by the aircraft 108 at a frequency of 0.1 to 2.0 Hz.

In general, the flight status of the aircraft 108 can be identified when terrestrial receivers 111 receive the ADS-B messages 110 and report them to a ground control station (e.g., a system, device, or environment that is connected to and/or included in the ground station 106). Users at the ground control station can track the flight path of the aircraft 108 based on the ADS-B messages 110 received by the terrestrial receivers 111. This technique can be reliable in airspace within range of the terrestrial receivers 111. For example, the terrestrial receivers 111 are associated with a transmission region 113. The transmission region 113, in some examples, has a boundary that is 100 nautical miles from the terrestrial receivers 111, which may correspond to the transmission length of the ADS-B messages 110. When the aircraft 108 is disposed in the transmission region 113, the ADS-B messages 110 broadcast by the aircraft 108 are received by the terrestrial receivers 111. However, when the aircraft 108 is travelling outside of the transmission region 113, the terrestrial receivers 111 are unable to receive the ADS-B messages 110 broadcast by the aircraft 108. For instance, the aircraft 108 may be flying over remote regions, such as regions in the arctic circle, regions that include uninhabitable terrain (e.g., mountainous regions), regions without infrastructure (e.g., remote islands, desert regions), regions without reliable infrastructure (e.g., active warzones, ecological protected areas, such as national parks), or oceanic regions relatively distant from the terrestrial coastline (e.g., regions that are greater than 100 nautical miles from the coastline).

In various implementations of the present disclosure, the satellites 104 in the satellite network 102 are configured to receive and process the ADS-B messages 110 from the aircraft 108. Because the coverage regions of the satellite network 102 include airspace corresponding to regions outside of the transmission region 113, which may not include terrestrial receivers 111, the satellite network 102 may receive the ADS-B messages 110 even when there are no terrestrial receivers 111 available to do so.

In some examples, the satellites 104 transmits at least some of the ADS-B messages 110 to the ground station 106. For instance, one of the satellites 104 receives the ADS-B messages 110 and transmits at least a portion of the data from the ADS-B messages 110 to the ground station 106. In some cases, at least one other satellite 104 relays the data to the ground station 106, in cases wherein the original satellite 104 receiving the ADS-B messages 110 is outside of a coverage region of the ground station 106. Thus, the satellite network 102 can enable the surveillance system 112 to track aircraft 108 outside of the transmission region 113 and/or the coverage region of the ground station 106.

According to various implementations, it may be disadvantageous to relay all of the ADS-B messages 110 from the aircraft 108 to the ground station 106 and/or the surveillance system 112. In some cases, the aircraft 108 broadcasts the ADS-B messages 110 at a relatively high retransmission frequency. Further, in some implementations, multiple aircraft 108 are transmitting respective ADS-B messages 110 that are received by the satellite network 102. Thus, even if the individual ADS-B messages 110 carry a limited amount of data, the aggregate data in the ADS-B messages 110 can be substantial. In some cases, transmitting the aggregate data across the satellite network 102 can occupy a significant amount of communication resources utilized by the satellite network 102. As used herein, the term "communication resource," and its equivalents, may refer to an amount of bandwidth available for transmitting data over one or more communication networks. Thus, if the satellite network 102 merely retransmits all of the ADS-B messages 110 to the ground station 106, the communication resources of the satellite network 102 can become unnecessarily congested.

In some cases, the satellites 104 pre-process the ADS-B messages 110. For example, the satellites 104 determine whether the ADS-B messages 110 satisfy one or more conditions. If any of the satellites 104 determine that the ADS-B messages 110 satisfy the condition(s), then the satellites 104 notify a surveillance system 112 by transmitting an alert 114 to the ground station 106. If the satellites 104 determine that the ADS-B messages 110 do not satisfy the condition(s), then the satellites 104 refrain from transmitting the alert 114, or any data included in the ADS-B messages 110, toward the ground station 106. In various implementations, the alert 114 includes less data than the total amount of data included in the ADS-B messages 110. Accordingly, communication resources of the satellite network 102 and the ground station 106 can be conserved. In various implementations, the satellites 104 include or otherwise embody a computing device that includes at least one processor configured to perform operations described herein.

The surveillance system 112, in various implementations, is implemented by at least one computing device. In some cases, the surveillance system 112 is located on a router and/or server communicatively coupled to the ground station 106. In some implementations, the surveillance system 112 is implemented by the ground station 106. The surveillance system 112, for instance, is implemented by at least one processor of one or more computing devices. According to some examples, the surveillance system 112 is communicatively coupled to multiple ground stations including the ground station 106. The satellites 104 may communicate the alert 114 to the surveillance system 112 by transmitting the alert 114 to any ground station connected to the surveillance system 112. Accordingly, the surveillance system 112 may efficiently receive the alert 114 regardless of the relative global position of the satellites 104 at the time that they determine that the ADS-B messages 110 satisfy the condition(s).

In some implementations, the surveillance system 112 specifies the condition(s). For instance, the surveillance system 112 may generate a surveillance instruction 116 that indicates the condition(s). The surveillance system 112 may transmit the surveillance instruction 116 to at least one of the satellites 104 in the satellite network 102 via the ground station 106. In some cases, the surveillance instruction 116 is forwarded between the satellites 104, such that a satellite 104 that is not currently in the coverage region of the ground station 106 may nevertheless receive the surveillance instruction 116.

Various types of conditions can be specified in the surveillance instruction 116 and/or used by the satellites 104 to analyze the ADS-B messages 110. In some cases, at least one of the satellites 104 generate the alert 114 in response to determining that a feature of the ADS-B messages 110 is anomalous. In various cases, the satellites 104 determine a flight path 118 and/or altitude 120 of the aircraft 108 based on the ADS-B messages 110. As used herein, the term "flight path," and its equivalents, may refer to a trajectory and/or at least one previous location of an aircraft during flight. As used herein, the term "altitude," and its equivalents, may refer to a height estimated based on a current pressure reading (e.g., baro-corrected altitude) or a height estimated based on at least one transmission with a location service, such as a GPS satellite (e.g., GNSS height). In some cases, the satellite(s) 104 generate the alert 114 in response to determining that the flight path 118 and/or the altitude 120 of the aircraft 108 is anomalous. For example, the satellite(s) 104 may determine that the flight path 118 is greater than a threshold distance from an expected flight path. In some cases, the satellite(s) 104 determine that the altitude 120 of the aircraft 108 is greater than a threshold distance from an expected altitude of the aircraft 108. In some cases, the satellite(s) 104 determines that the rate of change of the flight path 118 and/or the altitude 120 is outside of a threshold range. For example, the satellite(s) 104 may detect if the aircraft 108 is slowing down unexpectedly and/or is gaining altitude at an unexpected rate.

The satellite(s) 104, for example, perform anomaly detection on the flight path 118 and/or the altitude 120. In some cases, the satellite(s) 104 store and/or generate at least one machine learning (ML) model configured to perform anomaly detection. The ML model(s), for instance, perform supervised anomaly detection, semi-supervised anomaly detection, or unsupervised anomaly detection. In various cases, the ML model(s) include a k-nearest neighbor model, a Bayesian network, a hidden Markov model (HMM), an isolation forest, or any combination thereof. The ML model(s) may be trained based on previous flight paths and/or altitudes detected from previous ADS-B messages received from the aircraft 108 and/or additional aircraft. In some cases, the ML model(s) are trained based on planned flight paths, such as based on predetermined flight schedules provided by airports and/or airlines. In various implementations, the ML model(s) are generated by the satellites 104 based on the surveillance instruction 116 and/or the ML model(s) are generated by the surveillance system 112 and included in the surveillance instruction 116. The satellite(s) 104, in various cases, may generate the alert 114 based on determining that the flight path 118 and/or altitude 120 is an outlier of previous flight paths and/or altitude patterns learned by the ML model(s). In some examples, the satellite(s) 104 may automatically determine if the aircraft 108 is malfunctioning based on an anomalous change in altitude 120. Anomalies in flight path 118 and/or altitude 120 may be associated with dire malfunctions of the aircraft 108 itself, rogue pilots, or even hijacking events. Therefore, the alert 114 may indicate to the surveillance system 112 that the people in the aircraft 108 may be in danger.

According to some examples, at least one of the satellites 104 generates the alert in response to determining that the flight path 118 has entered, or is predicted to enter, a predetermined airspace. As used herein, the term "airspace," and its equivalents, may refer to a portion of the atmosphere. In some cases, airspace is controlled or otherwise associated with a country or territory below the airspace. In some examples, airspace is not associated with any particular country, such as certain regions of airspace above the oceans. In various cases, the predetermined airspace is indicated in the surveillance instruction 116. In some examples, the predetermined airspace includes a region that omits the terrestrial receivers 111. In other words, the predetermined airspace includes a region where the aircraft 108 cannot be detected by the terrestrial receivers 111. For instance, the predetermined airspace can be a region above deep ocean, mountains, or a remote nation that does not have any of the territorial receivers 111 within its infrastructure. Accordingly, the surveillance system 112 may track the aircraft 108 even when its flight path 118 crosses a region without the terrestrial receivers 111.

In some examples, the predetermined airspace is defined according to a security concern. For instance, the predetermined airspace may be within an active warzone and/or a region with particular military or human rights significance. Thus, the surveillance system 112 may determine if the aircraft 108 poses a security risk, or if the aircraft 108 is wandering into a region that poses a risk to the aircraft 108 or the people onboard.

According to some cases, at least one of the satellites 104 generates the alert 114 in response to determining that the ADS-B messages 110 indicate that the aircraft 108 is a predetermined aircraft and/or part of a predetermined group of aircraft. For instance, the satellites 104 may track a particular aircraft-of-interest or aircraft within a particular airline-of-interest and ignore other aircraft flying through the atmosphere. In some implementations, the surveillance system 112 specifies the predetermined aircraft in the surveillance instruction 116 in response to a determination that the predetermined aircraft is missing, suspicious, or otherwise significant. Accordingly, the satellites 104 can be used to track predetermined aircraft anywhere in the world, without necessarily tracking and reporting on every aircraft sending ADS-B messages.

Several examples will now be described with respect to FIG. 1. In a first example, a rogue pilot has gained control of the aircraft 108. In various implementations, the rogue pilot directs the aircraft 108 to travel over a deep ocean area outside of the transmission region 113. However, assuming that the rogue pilot is unable to deactivate a transmitter of the ADS-B messages 110, the satellites 104 may receive the ADS-B messages 110 from the aircraft. In addition, at least one of the satellites 104 may recognize that the flight path 118 of the aircraft 108 is anomalous, by determining that the aircraft 108 is greater than a threshold distance from an expected flight path of the aircraft 108. Upon determining that the flight path 118 of the aircraft 108 is anomalous, the satellites 104 may transmit an alert 114 indicating the location of the aircraft 108 and that the flight path 118 is anomalous. Accordingly, a user of the surveillance system 112 may recognize that the rogue pilot is in control of the aircraft 108 before the rogue pilot harms passengers on the aircraft 108 or other aircraft traveling near the flight path 118.

In a second example, the surveillance system 112 may determine that a flight control system of the aircraft 108 is malfunctioning. For instance, the satellites 104 may detect if the flight control system causes the aircraft 108 to rapidly gain altitude, or decrease altitude, by analyzing the ADS-B messages 110. In various cases, the satellites 104 report the sudden changes in the altitude 120 in the alert 114.

In a third example, the surveillance system 112 may determine that the aircraft 108 is flying over a protected area, such as a national park. For instance, a nation may restrict aircraft from flying over a protected area at night, to limit noise and/or light pollution in the protected area. For instance, the noise and/or light pollution may interfere with efforts to conserve certain bird populations in the protected area. If the satellites 104 detect that the flight path 118 enters airspace over the protected area by analyzing the ADS-B messages 110, then the satellites 104 may indicate the issue via the alert 114. The alert 114 may further identify the aircraft 108, such that the pilot and/or airline of the aircraft 108 may be held accountable for violating the restriction on flights over the protected area.

Although FIG. 1 illustrates a single ground station 106, implementations are not so limited. In some cases, the surveillance system 112 is distributed over and/or communicatively coupled to multiple ground stations 106 disposed on the surface of the Earth. For example, a first ground station 106 may transmit the surveillance instruction 116 and a second ground station 106 may receive the alert 114.

Various elements of FIG. 1 are configured to communicate over one or more communication networks (not illustrated). The communication network(s) may include at least one wired interface, at least one wireless interface, or a combination thereof. Examples of wired interfaces include Ethernet cables, electrical cables, optical cables, and the like. Examples of wireless interfaces include BLUETOOTH™ interfaces, Institute of Electrical and Electronics (IEEE) interfaces (e.g., WI-FI™ interfaces), $3^{rd}$ Generation Partnership Project (3GPP) interfaces (e.g., Long Term Evolution (LTE) radio interfaces, New Radio (NR) radio interfaces, etc.), Near Field Communication (NFC) interfaces, and the like. In some implementations, the communication network(s) include at least one wide area network (WAN), such as the Internet. The communication network(s) may include at least one core network, such as an Internet Protocol (IP) Multimedia Subsystem (IMS) network and/or a cellular core network (e.g., an Evolved Packet Core (EPC), $5^{th}$ Generation (5G) Core (5GC), etc.). Electrical signals, electromagnetic signals, optical signals, and the like, may encode data and be transmitted over one or more interfaces in the communication network(s) by various elements within the environment 100. Various messages depicted in FIG. 1 (e.g., the ADS-B messages 110, the alert 114, and the surveillance instruction 116) may be encoded into physical signals transmitted over the communication network(s). In some cases, the messages are embodied in IP data packets, such as in payloads of the data packets.

FIGS. 2A to 2C illustrate examples of types of aircraft conditions that can be indicated in ADS-B messages and tracked by a satellite network. FIG. 2A illustrates an environment 200 in which an aircraft 202 has an anomalous altitude 204 and/or an anomalous change in the altitude 204. For example, the altitude 204 is outside of a predetermined range associated with the type of the aircraft 202 and/or a flight path of the aircraft 202. In some cases, a rate-of-change (e.g., a time differential) of the altitude 204 is outside of a predetermined range, indicating that the altitude 204 is rapidly increasing or decreasing. At least one satellite may identify the altitude 204 and/or the rate-of-change of the altitude 204 based on ADS-B messages transmitted by the aircraft 202. In various cases, the satellite(s) may determine that the altitude 204 and/or the rate-of-change of the altitude 204 is outside of a predetermined range, and in response, transmit an alert to a surveillance system.

FIG. 2B illustrates an environment 208 in which an aircraft 210 has an anomalous flight path 212. For example, a position, velocity, or acceleration of the aircraft 210 may be outside of a predetermined range. In some cases, a shape of the flight path 212 is unusual compared to an expected flight path of the aircraft 210. For example, the shape of the flight path 212 may be different than a previous flight path of the aircraft 210, a previous flight path of an aircraft flying the same flight as the aircraft 210, or different than another predetermined flight path. In various cases, at least one satellite may determine that the flight path 212 is anomalous and, in response, transmit an alert.

FIG. 2C illustrates an example environment 214 including an aircraft 216 that is within a predetermined airspace 218. In various cases, the predetermined airspace 218 is defined as a portion of the atmosphere that is above a geographic region 220 of the earth. For example, the geographic region 220 may be a particular territory or country. In some cases, the geographic region 220 omits one or more terrestrial receivers capable of receiving ADS-B messages from the aircraft 216. At least one satellite may generate and transmit an alert in response to determining that the aircraft 216 has entered the predetermined airspace 218.

FIG. 3 illustrates an example process 300 for monitoring aircraft using ADS-B messages. The process 300 can be performed by an entity, which may include at least one of a processor, a computing device, a satellite, a ground station, or any combination thereof.

At 302, the entity receives ADS-B messages from at least one aircraft. In various cases, the ADS-B messages are received by at least one satellite. According to some cases, the ADS-B messages are wireless signals transmitted over a 978 MHz and/or a 1090 MHz link. In various implementations, the at least one aircraft broadcasts ADS-B messages at a retransmission frequency, such as a retransmission frequency between 0.05 to 10 Hz. For instance, the at least one aircraft broadcasts the ADS-B messages once every 0.1 to 20 seconds. The at least one satellite, in various implementations, includes at least one LEO satellite.

At 304, the entity determines, based on the ADS-B messages, that at least one condition has been satisfied. In various implementations, the entity may determine, based on the ADS-B messages, that the at least one aircraft has an anomalous flight path and/or flight altitude. For example, the entity accesses a predictive model that the entity uses to perform anomaly detection on the flight path and/or altitude indicated in the ADS-B messages. In some implementations, the entity determines, based on the ADS-B messages, that the at least one aircraft is a predetermined aircraft. For instance, the predetermined aircraft may be of interest for some reason (e.g., the predetermined aircraft is suspected of being hijacked), and the entity may identify the aircraft and its flight details based on the ADS-B messages. In some cases, the entity determines, based on the ADS-B messages, that the aircraft is disposed in a predetermined airspace. For example, the entity determines that the aircraft is located in an airspace that is outside of a coverage area of a terrestrial ADS-B receiver. In some cases, the entity determines that the aircraft is located in a protected airspace, such as an airspace disposed over a protected region (e.g., a protected ecological park) or over a warzone.

At 306, the entity transmits an alert. In various implementations, the entity transmits the alert as a wireless signal to a satellite and/or a ground station. In some implementations, the alert is relayed throughout a satellite network by one or more satellites to the ground station. In some examples, the ground station is communicatively coupled to a client device, such as a computing device operated by a ground control station. Accordingly, a user of the computing device (e.g., an air traffic controller) may be informed of whether the condition has been satisfied. In various implementations, the alert includes significantly less data than the ADS-B messages received by the entity. For example, the entity may receive multiple ADS-B messages from multiple aircraft that do not indicate the condition is satisfied. Thus, by evaluating the ADS-B messages prior to sending the alert, the entity can limit the amount of data transmitted to the ground station and/or computing device, or within the satellite network.

FIG. 4 illustrates an example process 400 for instructing at least one satellite to perform surveillance on aircraft. The process 400 can be performed by an entity, which may include at least one of a processor, a computing device, a satellite, a ground station, or any combination thereof.

At 402, the entity transmits, to at least one satellite, an instruction to monitor ADS-B messages for one or more conditions. In various implementations, the instruction may be to determine, based on the ADS-B messages, that at least one aircraft has an anomalous flight path and/or flight altitude. For example, the instruction may be to access and/or generate a predictive model that the at least one satellite uses to perform anomaly detection on the flight path and/or altitude indicated in the ADS-B messages. In some implementations, the instruction may be to determine, based on the ADS-B messages, that the at least one aircraft is a predetermined aircraft. For instance, the predetermined aircraft may be of interest for some reason (e.g., the predetermined aircraft is suspected of being hijacked), and the entity may identify the aircraft and its flight details based on the ADS-B messages. In some cases, the instruction may be to determine, based on the ADS-B messages, that the aircraft is disposed in a predetermined airspace. For example, the instruction may be to determine whether the aircraft is located in an airspace that is outside of a coverage area of a terrestrial ADS-B receiver. In some cases, the instruction may be to determine that the aircraft is located in a protected airspace, such as an airspace disposed over a protected region (e.g., a protected ecological park) or over a warzone.

At 404, the entity receives, from the at least one satellite, an alert indicating that at least one condition has been satisfied. In various implementations, the alert is relayed via one or more satellites in a satellite network. The alert, for instance, indicates a time and/or location at which the at least one condition has been satisfied. In some cases, the alert includes one or more data packets.

Figure 5:
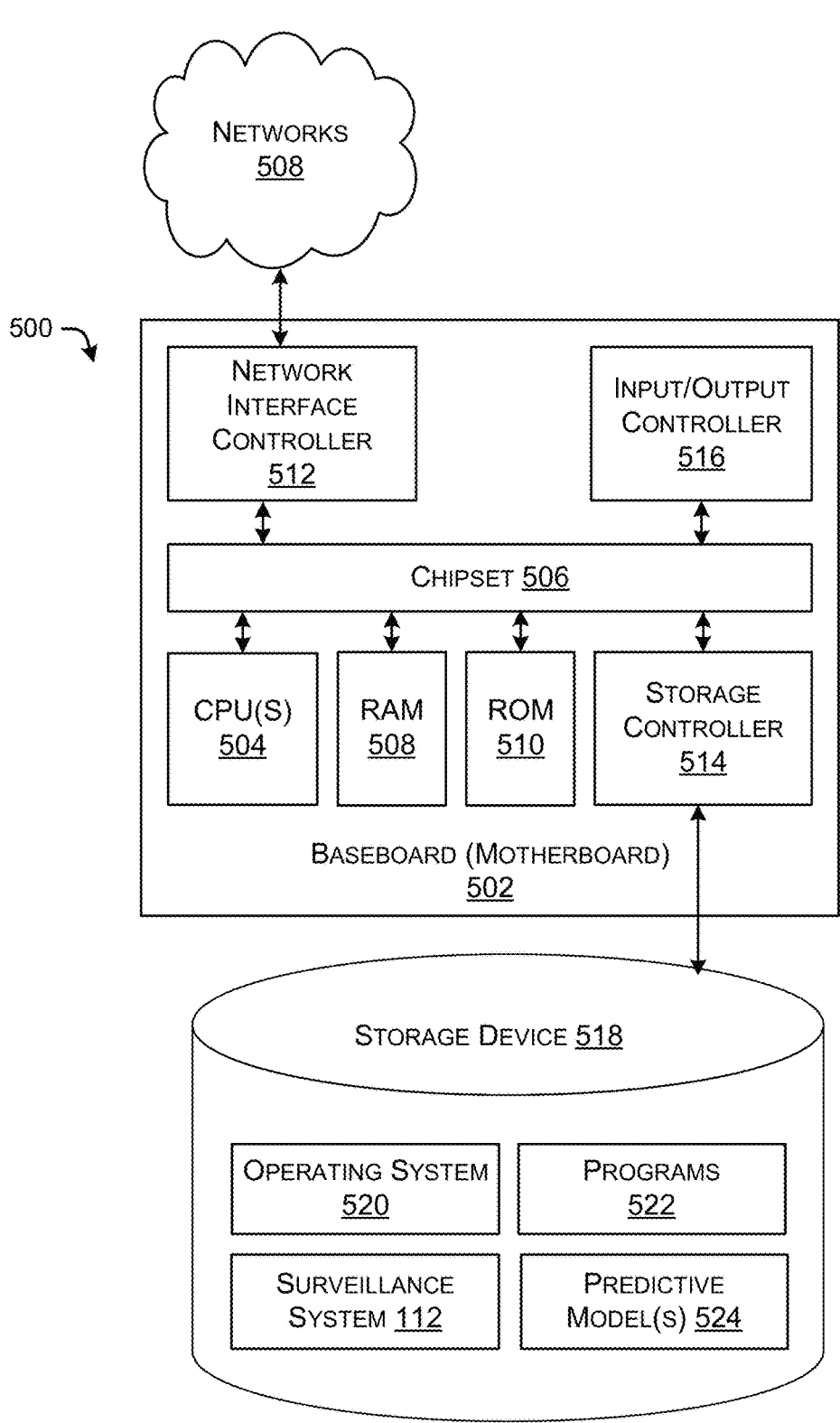
FIG. 5 shows an example computer architecture for a server computer capable of executing program components for implementing the functionality described herein.

FIG. 5 shows an example computer architecture for a computer 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The computer 500 may, in some examples, correspond to a network node. In various implementations, the computer 500 resides or is otherwise incorporated into a satellite, such as a LEO satellite.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a random-access memory (RAM) 508, used as the main memory in the computer 500. The chipset 506 can further provide an interface to a computer-readable storage medium such as a read-only memory (ROM) 510 or non-volatile RAM (NVRAM) for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 512. The chipset 506 can include functionality for providing network connectivity through a network interface controller (NIC) 514, such as a gigabit Ethernet adapter. The NIC 514 is capable of connecting the computer 500 to other computing devices over the network 512. It should be appreciated that multiple NICs 514 can be present in the computer 500, connecting the computer 500 to other types of networks and remote computer systems. In some instances, the NICs 514 may include at least on ingress port and/or at least one egress port.

The computer 500 can be connected to a storage device 516 that provides non-volatile storage for the computer. The storage device 516 can store an operating system 518, programs 520, and data, which have been described in greater detail herein. The storage device 516 can be connected to the computer 500 through a storage controller 522 connected to the chipset 506. The storage device 516 can consist of one or more physical storage units. The storage controller 516 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 500 can store data on the storage device 516 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 516 is characterized as primary or secondary storage, and the like.

For example, the computer 500 can store information to the storage device 516 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 516 by detecting the physical states or characteristics of one or more particular locations within the physical storage units.

In addition to the mass storage device 516 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by any network node described herein may be supported by one or more devices similar to computer 500. Stated otherwise, some or all of the operations performed by a network node may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 516 can store an operating system 518 utilized to control the operation of the computer 500. According to one embodiment, the operating system comprises the LINUX™ operating system. According to another embodiment, the operating system includes the WINDOWS™ SERVER operating system from MICROSOFT Corporation of Redmond, Washington.

According to further embodiments, the operating system can comprise the UNIX™ operating system or one of its variants. It should be appreciated that other operating systems can also be utilized. The storage device 516 can store other system or application programs and data utilized by the computer 500.

In one embodiment, the storage device 516 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

As illustrated in FIG. 5, the storage device 516 stores programs 520, which may include one or more processes 524, as well as the surveillance system 112 and one or more predictive models 524. The process(es) 524 may include instructions that, when executed by the CPU(s) 504, cause the computer 500 and/or the CPU(s) 504 to perform one or more operations.

The computer 500 can also include one or more input/output controllers 528 for receiving and processing input from a number of input devices, such as a keyboard, a mouse, a touchpad, a touch screen, an electronic stylus, or other type of input device. Similarly, an input/output controller 528 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

transmitting, to at least one low earth orbit (LEO) satellite orbiting the earth and in a satellite network, an instruction to:

receive ADS-B messages from multiple aircraft;

determine that at least one of the ADS-B messages satisfies at least one condition; and in response to determining that at least one of the ADS-B messages satisfies the at least one condition, transmit an alert, a total amount of data in the alert being less than a total amount of data in the ADS-B messages; and receiving, from the at least one satellite, the alert.

2. The method of claim 1, the at least one LEO satellite being at least one first LEO satellite, wherein the at least one first LEO satellite is configured to transmit the instruction to at least one second LEO satellite in the satellite network.

3. The method of claim 1, wherein the instruction is to determine that at least one of the ADS-B messages satisfies at least one condition by determining that at least one of the ADS-B messages indicates an anomalous flight path.

4. The method of claim 1, wherein the instruction is to determine that at least one of the ADS-B messages satisfies at least one condition by determining that at least one of the ADS-B messages indicates an anomalous flight altitude.

5. The method of claim 1, wherein the instruction is to determine that at least one of the ADS-B messages satisfies at least one condition by determining that at least one of the ADS-B messages indicates that a particular aircraft among the aircraft is in a predetermined airspace, and wherein the predetermined airspace comprises a region that omits a coverage area of a terrestrial ADS-B receiver.

6. The method of claim 1, wherein the instruction is to determine that at least one of the ADS-B messages satisfies at least one condition by determining that at least one of the ADS-B messages was transmitted by a predetermined aircraft among the aircraft.

7. The method of claim 1, wherein the method is performed by a ground station.

8. A system, comprising:

at least one processor;

at least one transceiver; and one or more non-transitory media storing first instructions that, when executed by the system, cause the system to perform operations comprising:

cause the at least one transceiver to transmit, to at least one low earth orbit (LEO) satellite orbiting the earth and in a satellite network, a second instruction to:

receive ADS-B messages from multiple aircraft;

determine that at least one of the ADS-B messages satisfies at least one condition; and in response to determining that at least one of the ADS-B messages satisfies the at least one condition, transmit an alert, a total amount of data in the alert being less than a total amount of data in the ADS-B messages; and receive, from the at least one satellite via the at least one transceiver, the alert.

9. The system of claim 8, the at least one LEO satellite being at least one first LEO satellite, wherein the at least one first LEO satellite is configured to transmit the instruction to at least one second LEO satellite in the satellite network.

10. The system of claim 8, wherein the second instruction is to determine that at least one of the ADS-B messages satisfies at least one condition by determining that at least one of the ADS-B messages indicates an anomalous flight path.

11. The system of claim 8, wherein the second instruction is to determine that at least one of the ADS-B messages satisfies at least one condition by determining that at least one of the ADS-B messages indicates an anomalous flight altitude.

12. The system of claim 8, wherein the second instruction is to determine that at least one of the ADS-B messages satisfies at least one condition by determining that at least one of the ADS-B messages indicates that a particular aircraft among the aircraft is in a predetermined airspace, and wherein the predetermined airspace comprises a region that omits a coverage area of a terrestrial ADS-B receiver.

13. The system of claim 8, wherein the second instruction is to determine that at least one of the ADS-B messages satisfies at least one condition by determining that at least one of the ADS-B messages was transmitted by a predetermined aircraft among the aircraft.

14. The system of claim 8, wherein the alert comprises data aggregated from multiple ADS-B messages among the ADS-B messages or data summarizing the multiple ADS-B messages.

15. A system, comprising:

a ground station comprising:

a first transceiver configured to transmit a first instruction and to receive an alert; and a LEO satellite orbiting the earth, the LEO satellite comprising:

at least one second transceiver configured to receive the first instruction, to receive ADS-B messages from multiple aircraft; and to transmit the alert;

at least one processor; and memory storing second instructions that, when executed by the at least one processor, cause the at least one processor to perform operations comprising:

identifying at least one condition based on the first instruction;

determining that at least one of the ADS-B messages satisfies the at least one condition; and in response to determining that at least one of the ADS-B messages satisfies the at least one condition, causing the second transceiver to transmit the alert, a total amount of data in the alert being less than a total amount of data in the ADS-B messages.

16. The system of claim 15, wherein the memory further stores a machine learning (ML) model, wherein the operations further comprise training the ML model based on first ADS-B messages among the ADS-B messages; and wherein determining that at least one of the ADS-B messages satisfies the at least one condition comprises determining, using the ML model, that a second ADS-B message among the ADS-B messages is anomalous compared to the first ADS-B messages.

17. The system of claim 15, wherein determining that at least one of the ADS-B messages satisfies the at least one condition comprises at least one of:

determining that at least one of the ADS-B messages indicates an anomalous flight path;

determining that at least one of the ADS-B messages indicates an anomalous flight altitude;

determining that at least one of the ADS-B messages indicates that a particular aircraft among the aircraft is in a predetermined airspace; or determining that at least one of the ADS-B messages indicates that the particular aircraft is a predetermined aircraft.

18. The system of claim 15, the LEO satellite being a first LEO satellite, the system further comprising:

at least one second LEO satellite configured to relay the first instruction from the ground station to the first LEO satellite; and at least one third LEO satellite configured to relay the alert from the first LEO satellite to the ground station.

19. The system of claim 15, wherein the at least one second transceiver is configured to directly receive the ADS-B messages from the multiple aircraft.

20. The system of claim 15, wherein the instruction indicates a particular aircraft among the multiple aircraft, wherein determining that the at least one of the ADS-B messages satisfies the at least one condition comprises determining that a flight path or altitude of the particular aircraft is anomalous, and wherein the alert indicates that people in the particular aircraft may be in danger.

* * * * *